United States Patent
Sugiyama et al.

(10) Patent No.: US 9,126,620 B2
(45) Date of Patent: Sep. 8, 2015

(54) ELECTRIC POWER STEERING SYSTEM

(71) Applicant: JTEKT CORPORATION, Osaka-shi, Osaka (JP)

(72) Inventors: Toyoki Sugiyama, Kitakatsuragi-gun (JP); Masayasu Higashi, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/314,542

(22) Filed: Jun. 25, 2014

(65) Prior Publication Data
US 2015/0008066 A1    Jan. 8, 2015

(30) Foreign Application Priority Data
Jul. 4, 2013  (JP) .................. 2013-140780

(51) Int. Cl.
*B62D 5/04*    (2006.01)
(52) U.S. Cl.
CPC ............ *B62D 5/0475* (2013.01); *B62D 5/0481* (2013.01)
(58) Field of Classification Search
CPC .............................. B62D 5/0481; B62D 5/046
USPC ...................... 180/443, 444, 446; 701/41, 42; 318/105, 106; 320/118
See application file for complete search history.

(56) References Cited

U.S. PATENT DOCUMENTS

2002/0109407 A1*  8/2002  Morimoto et al. .......... 307/10.1
2011/0264326 A1* 10/2011  Iwasaki ........................ 701/41

FOREIGN PATENT DOCUMENTS

| EP | 2 208 658 A1 | 7/2010 |
|---|---|---|
| JP | U-5-49519 | 6/1993 |
| JP | A-2009-78743 | 4/2009 |
| JP | A-2009-95112 | 4/2009 |
| WO | 2009/125265 A2 | 10/2009 |

OTHER PUBLICATIONS

Feb. 26, 2015 Search Report issued in European Patent Application No. 14 17 5391.3.

* cited by examiner

*Primary Examiner* — Joseph Rocca
*Assistant Examiner* — Jacob Knutson
(74) *Attorney, Agent, or Firm* — Oliff PLC

(57) ABSTRACT

An electric power steering system includes: an assist motor that generate assist force for assisting steering of a steering member; a motor drive circuit that controls driving of the assist motor; a capacitor that is electrically connected to a main power supply that supplies electric power to the assist motor, the motor drive circuit, and electrical components; and a controller that controls charging and discharging of the capacitor. The controller discharges electricity to the electrical components when an amount of electric charge remaining in the auxiliary power supply is equal to or greater than a first threshold value in an engine start-up period in a vehicle.

4 Claims, 8 Drawing Sheets

FIG. 3

| | CHARGING-DISCHARGING CIRCUIT | | BOOSTING CIRCUIT | | SWITCHING CIRCUIT | | |
|---|---|---|---|---|---|---|---|
| | S1 | S2 | S3 | S4 | S5 | S6 | S7 |
| FIRST OUTPUT STATE | OFF | ON | OFF | OFF | OFF | ON | ON |
| SECOND OUTPUT STATE | ON | OFF | OFF | OFF | OFF | ON | ON |
| THIRD OUTPUT STATE | OFF | ON | $\overline{PWM}$ | PWM | OFF | ON | ON |
| FOURTH OUTPUT STATE | ON | OFF | OFF | ON | ON | OFF | OFF |

ELECTRIC POWER STEERING SYSTEM

INCORPORATION BY REFERENCE

The disclosure of Japanese Patent Application No. 2013-140780 filed on Jul. 4, 2013 including the specification, drawings and abstract, is incorporated herein by reference in its entirety.

BACKGROUND OF THE INVENTION

1. Field of the Invention

The invention relates to an electric power steering system including an auxiliary power supply.

2. Description of the Related Art

A conventional electric power steering system includes an auxiliary power supply connected in series with a main power supply. The electric power steering system is configured such that, when an assist motor that assists steering of a steering member consumes a large amount of electric power, for example, when a stationary steering (steering operation performed while a vehicle is not travelling) is performed, the assist motor is driven by electric power from the main power supply and the auxiliary power supply. Thus, the amount of electric power that the main power supply needs to discharge is restricted. The electric power steering system is configured such that, when the assist motor consumes only a small amount of electric power, for example, when the vehicle is driven without performing a stationary steering, the assist motor is driven only by the electric power supplied from the main power supply. The main power supply supplies electric power to electrical components. Japanese Patent Application Publication No. 2009-78743 (JP 2009-78743 A) describes an example of the configuration of such a conventional electric power steering system.

The voltage of the main power supply abruptly drops when a starter motor is driven in an engine start-up period. Thus, the voltage that is supplied from the main power supply to a microcomputer for driving electrical components may fall below the voltage required to drive the microcomputer. In this case, the microcomputer is initialized. This causes a possibility that the electrical components will malfunction. Note that such a possibility may be caused not only in the electrical components but also in a microcomputer for driving the assist motor.

SUMMARY OF THE INVENTION

One object of the invention is to provide an electric power steering system that makes it possible to suppress occurrence of malfunctions of electrical components and an assist motor in an engine start-up period.

An electric power steering system according to an aspect of the invention includes: an assist motor that generates assist force for assisting steering of a steering member; a drive control unit that controls driving of the assist motor; an auxiliary power supply that is electrically connected to an electrical component of a vehicle other than the assist motor and the drive control unit, one of the assist motor and the drive control unit, and a main power supply electrically connected to the assist motor; and a power supply control unit that controls supply of electric power from the auxiliary power supply to the electrical component. The power supply control unit supplies the electric power from the auxiliary power supply to the electrical component when an amount of electric charge remaining in the auxiliary power supply is equal to or greater than a threshold value in an engine start-up period in the vehicle.

The auxiliary power supply of the electric power steering system according to the above aspect discharges electricity to the electrical component when the amount of electric charge remaining in the auxiliary power supply is equal to or greater than the threshold value in the engine start-up period. Thus, even if the voltage of the main power supply drops in the engine start-up period, the electrical component is stably supplied with electric charge from the auxiliary power supply. As a result, it is possible to suppress a malfunction of the electrical component in the engine start-up period.

An electric power steering system according to another aspect of the invention includes: an assist motor that generates assist force for assisting steering of a steering member; a control circuit that controls an operation of the assist motor; an auxiliary power supply that is electrically connected to a main power supply electrically connected to the assist motor, the assist motor, and the control circuit; and a power supply control unit that controls supply of electric power from the auxiliary power supply to the control circuit. The power supply control unit supplies electric power to the control circuit when an amount of electric charge remaining in the auxiliary power supply is equal to or greater than a threshold value in an engine start-up period in a vehicle.

The auxiliary power supply of the electric power steering system according to the above aspect discharges electricity to the control circuit when the amount of electric charge remaining in the auxiliary power supply is equal to or greater than the threshold value in the engine start-up period. Thus, even if the voltage of the main power supply drops in the engine start-up period, the control circuit is stably supplied with electric charge from the auxiliary power supply. As a result, it is possible to suppress a malfunction of the assist motor in the engine start-up period.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a table illustrating the operating states of switching elements in the embodiment;

FIG. 4A to FIG. 4D are circuit diagrams illustrating the operations of the switching elements and flows of electricity, wherein FIG. 4A is a circuit diagram illustrating a first output state, FIG. 4B is a circuit diagram illustrating a second output state, FIG. 4C is a circuit diagram illustrating a third output state, and FIG. 4D is a circuit diagram illustrating a fourth output state;

DETAILED DESCRIPTION OF EMBODIMENTS

Figure 1:
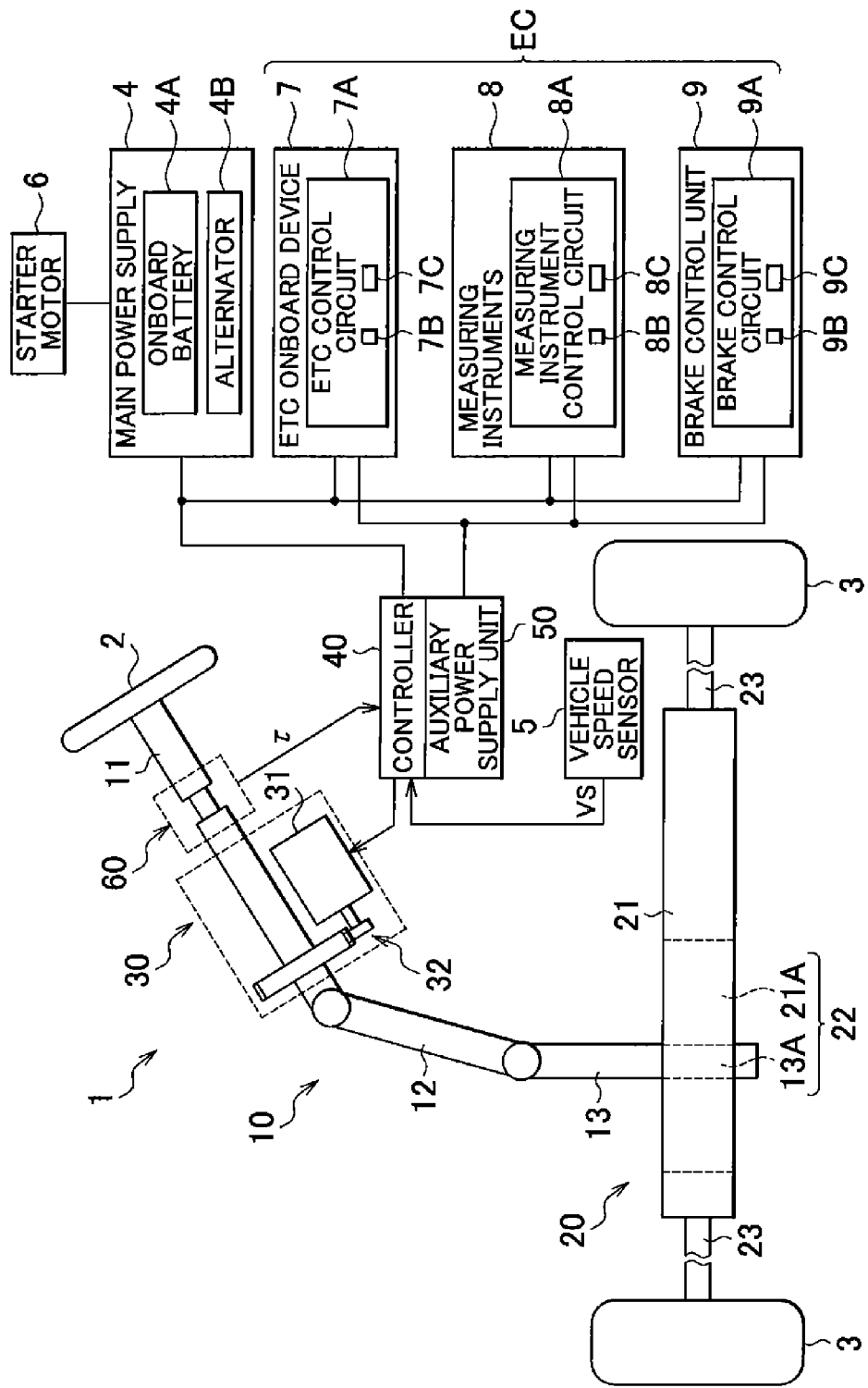
FIG. 1 is a view schematically illustrating the configuration of an electric power steering system according to an embodiment of the invention.

With reference to FIG. 1, the configuration of an electric power steering system 1 according to an embodiment of the invention will be described below. The electric power steering system 1 includes a steering mechanism 10, a steered mechanism 20, an assist unit 30, an auxiliary power supply unit 50, and a torque detection unit 60. A main power supply 4 and the auxiliary power supply unit 50 supply electric power to the assist unit 30.

The steering mechanism 10 includes a column shaft 11, an intermediate shaft 12, and a pinion shaft 13. The column shaft 11, the intermediate shaft 12, and the pinion shaft 13 rotate together with each other as a steering member 2 is turned. The upper end of the column shaft 11 is connected to the steering member 2. The upper end of the intermediate shaft 12 is connected to the lower end of the column shaft 11. Pinion teeth 13A are formed on the pinion shaft 13.

The steered mechanism 20 includes a rack shaft 21. The opposite ends of the rack shaft 21 are connected to steered wheels 3 via, for example, tie rods 23. Rack teeth 21A are formed on the rack shaft 21. The rack teeth 21A are engaged with the pinion teeth 13A. The rack teeth 21A and the pinion teeth 13A are engaged with each other to constitute a rack-and-pinion mechanism 22.

The assist unit 30 includes an assist motor 31, a speed reducer 32, and a controller 40. The electric power steering system 1 according to the present embodiment is a column assist-type electric power steering system that assists a driver's steering operation by transmitting rotative force of an output shaft of the assist motor 31, as assist force, to the column shaft 11. The assist motor 31 is a three-phase brushless motor. The speed reducer 32 is a worm gear including a worm shaft and a worm wheel (both of which are not illustrated) that are engaged with each other. The worm shaft is fixed to the output shaft of the assist motor 31. The worm wheel is fixed to the column shaft 11. The controller 40 executes assist control of controlling the driving of the assist motor 31 and power supply control of controlling a charging-discharging operation of the auxiliary power supply unit 50. The controller 40 may function as a power supply control unit.

With the configuration of the assist unit 30, the assist force is applied to the column shaft 11 as follows. The controller 40 computes the assist force corresponding to the driver's steering through the assist control. By driving the assist motor 31 on the basis of the computed assist force, the output shaft of the assist motor 31 rotates. The rotative force of the output shaft of the assist motor 31 is applied, as the assist force, to the column shaft 11 via the speed reducer 32.

The auxiliary power supply unit 50 is electrically connected to the main power supply 4, electrical components EC, and the controller 40. The auxiliary power supply unit 50 is not electrically connected to elements other than the main power supply 4, the electrical components EC, and the controller 40. The auxiliary power supply unit 50 supplies electric power to the controller 40 and the electrical components EC by discharging electricity to the controller 40 and the electrical components EC.

The torque detection unit 60 outputs a torque signal corresponding to the magnitude of a torque (hereinafter, referred to as "steering torque $\tau$") applied to the column shaft 11 by the steering of the steering member 2, to the controller 40 via an onboard communication network.

The configuration of an electrical system of a vehicle in which the electric power steering system 1 is mounted will be described below. A vehicle speed sensor 5 is connected to the controller 40 via the onboard communication network. The vehicle speed sensor 5 outputs a signal corresponding to a travelling speed (hereinafter, referred to as "vehicle speed VS") of the vehicle to the controller 40.

The main power supply 4 is electrically connected to the controller 40, the auxiliary power supply unit 50, a starter motor 6, and the electrical components EC. The main power supply 4 supplies electric power to the controller 40, the auxiliary power supply unit 50, the starter motor 6, and the electrical components EC. The main power supply 4 includes an onboard battery 4A and an alternator 4B. The onboard battery 4A is electrically connected to the alternator 4B.

The electrical components EC include an ETC onboard device 7, measuring instruments 8, and a controller for a brake device (hereinafter, referred to as "brake control unit 9"). The electrical components EC are electrically connected to the auxiliary power supply unit 50.

The ETC onboard device 7 includes an ETC control circuit 7A. The ETC control circuit 7A includes a regulator 7B and a microcomputer 7C. The regulator 7B adjusts the voltage supplied from the main power supply 4 and the auxiliary power supply unit 50 to a voltage required to drive the microcomputer 7C. The microcomputer 7C controls the operation of the ETC onboard device 7.

The measuring instruments 8 have the function of indicating vehicle information from the vehicle speed sensor 5, a fuel gauge, a warning lamp, and the like. The measuring instruments 8 are indicated on a display of the vehicle. The measuring instruments 8 have a measuring instrument control circuit 8A. The measuring instrument control circuit 8A includes a regulator 8B and a microcomputer 8C. The regulator 8B adjusts the voltage supplied from the main power supply 4 and the auxiliary power supply unit 50 to a voltage required to drive the microcomputer 8C. The microcomputer 8C controls the operations of the measuring instruments 8.

The brake control unit 9 controls an operation of decreasing the vehicle speed VS or an operation of stopping the vehicle on the basis of an operation of a brake pedal (not illustrated). The brake control unit 9 has an ABS function of suppressing skidding due to locking of vehicle wheels during the operation on the brake pedal. The brake control unit 9 includes a brake control circuit 9A. The brake control circuit 9A includes a regulator 9B and a microcomputer 9C. The regulator 9B adjusts the voltage supplied from the main power supply 4 and the auxiliary power supply unit 50 to a voltage required to drive the microcomputer 9C. The microcomputer 9C controls the operation of the brake control unit 9.

The voltage adjusted by each of the regulators 7B, 8B, 9B is lower than the voltage at the time when the main power supply 4 is fully charged and lower than the voltage at the time when a capacitor 54 (see FIG. 2) of the auxiliary power supply unit 50 is fully charged.

Figure 2:
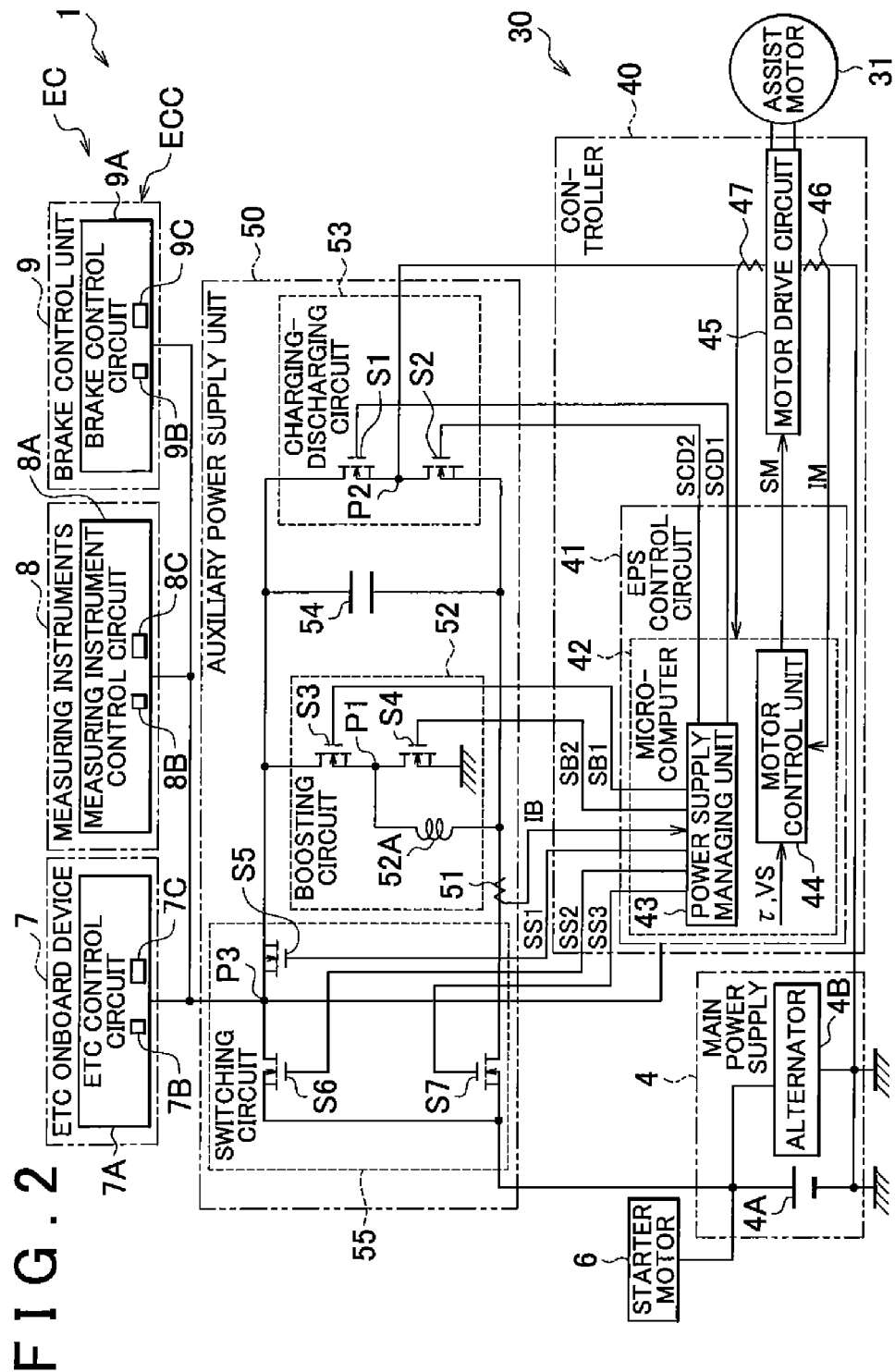
FIG. 2 is a circuit diagram illustrating the circuit configuration of the electric power steering system according to the embodiment.

The circuit configuration of the electric power steering system 1 will be described below with reference to FIG. 2. The controller 40 includes an EPS control circuit 41, a motor drive circuit 45, a current sensor 46, and a voltage sensor 47. The EPS control circuit 41 may function as the control circuit. The motor drive circuit 45 may function as a drive control unit.

The current sensor 46 outputs a signal corresponding to a current that is supplied to the assist motor 31 (hereinafter, referred to as "motor current IM") to the EPS control circuit 41. The voltage sensor 47 outputs a signal corresponding to the magnitude of a voltage that is applied to the motor drive circuit 45, to the EPS control circuit 41.

The EPS control circuit 41 includes a microcomputer 42. The EPS control circuit 41 controls the operation of the assist motor 31 by controlling the operation of the motor drive circuit 45.

The microcomputer 42 includes a power supply managing unit 43 and a motor control unit 44. The power supply managing unit 43 controls a charging-discharging operation of the auxiliary power supply unit 50. The motor control unit 44 outputs a motor control signal SM for generating the assist force of the assist motor 31, to the motor drive circuit 45.

The motor drive circuit 45 has a known configuration in which two switching elements are connected in series for each phase of the assist motor 31. The auxiliary power supply unit 50 is connected in series with the main power supply 4. The auxiliary power supply unit 50 includes a current sensor 51, a boosting circuit 52, a charging-discharging circuit 53, the capacitor 54, which may function as an auxiliary power supply, and a switching circuit 55.

The current sensor 51 is disposed between the switching circuit 55 and the boosting circuit 52. The current sensor 51 outputs a signal corresponding to the magnitude of an output current from the main power supply 4 (hereinafter, referred to as "battery current IB"), to the power supply managing unit 43.

The boosting circuit 52 boosts a voltage of the main power supply 4 (hereinafter, referred to as "battery voltage VB") and applies the boosted voltage to the capacitor 54. The boosting circuit 52 includes switching elements S3, S4 and a boosting coil 52A. The switching elements S3, S4 are MOSFETs. The upper-stage switching element S3 is connected to the capacitor 54 and the lower-stage switching element S4. The switching element S4 is grounded. One end of the boosting coil 52A is connected to a connection point P1 at which the switching element S3 and the switching element S4 are connected to each other. The other end of the boosting coil 52A is connected to the main power supply 4 via the switching circuit 55.

A boosting signal SB1 from the power supply managing unit 43 is input into the gate of the switching element S3 of the boosting circuit 52. A boosting signal SB2 from the power supply managing unit 43 is input into the gate of the switching element S4. The switching elements S3, S4 are subjected to PWM driving on the basis of the boosting signals SB1, SB2.

The charging-discharging circuit 53 is connected in series with the boosting circuit 52. The charging-discharging circuit 53 includes switching elements S1, S2. The switching elements S1, S2 are MOSFETs. The upper-stage switching element S1 is connected to the capacitor 54 and the lower-stage switching element S2. The lower-stage switching element S2 is connected to the main power supply 4 via the switching circuit 55. The charging-discharging circuit 53 is connected to the motor drive circuit 45, at a connection point P2 at which the switching element S1 and the switching element S2 are connected to each other.

A charging-discharging signal SCD1 from the power supply managing unit 43 is input into the gate of the switching element S1. A charging-discharging signal SCD2 from the power supply managing unit 43 is input into the gate of the switching element S2. The switching elements S1, S2 execute an operation of switching between an on-state and an off-state on the basis of the charging-discharging signals SCD1, SCD2.

The capacitor 54 is an electrical double-layer capacitor. The capacitor 54 is connected in parallel to the boosting circuit 52 and the charging-discharging circuit 53. The switching circuit 55 is connected in series with the main power supply 4. The switching circuit 55 is electrically connected to the ETC control circuit 7A, the measuring instrument control circuit 8A, and the brake control circuit 9A, at a connection point P3. Hereinafter, the ETC control circuit 7A, the measuring instrument control circuit 8A, and the brake control circuit 9A will be sometimes collectively referred to as "electrical component control circuit ECC".

The switching circuit 55 includes switching elements S5, S6, S7. The switching elements S5, S6, S7 are MOSFETs. The switching element S5 may function as a first switching element. The switching element S6 may function as a second switching element. The switching element S7 may function as a third switching element.

The switching element S5 switches the state between a state where the capacitor 54 and the electrical component control circuit ECC are electrically connected to each other and a state where the capacitor 54 and the electrical component control circuit ECC are electrically disconnected from each other. When the switching element S5 in an on-state, the switching element 55 electrically connects the capacitor 54 and the electrical component control circuit ECC to each other. When the switching element S5 is in an off-state, the switching element S5 electrically disconnects the capacitor 54 and the electrical component control circuit ECC from each other.

The switching element S6 is connected in series with the switching element S5. The switching element S6 switches the state between a state where the main power supply 4 and the electrical component control circuit ECC are electrically connected to each other and a state where the main power supply 4 and the electrical component control circuit ECC are electrically disconnected from each other. When the switching element S6 is in an on-state, the switching element S6 electrically connects the main power supply 4 and the electrical component control circuit ECC to each other. When the switching element S6 is in an off-state, the switching element S6 electrically disconnects the main power supply 4 and the electrical component control circuit ECC from each other.

The switching element S7 is connected in parallel to the switching element S6. The switching element S7 switches the state between a state where the main power supply 4 and the capacitor 54 are electrically connected to each other and a state where the main power supply 4 and the capacitor 54 are electrically disconnected from each other. When the switching element S7 is in an on-state, the switching element S7 electrically connects the main power supply 4 and the capacitor 54 to each other. When the switching element S7 is in an off-state, the switching element S7 electrically disconnects the main power supply 4 and the capacitor 54 from each other.

A switching signal SS1 from the power supply managing unit 43 is input into the gate of the switching element S5. A switching signal SS2 from the power supply managing unit 43 is input into the gate of the switching element S6. A switching signal SS3 from the power supply managing unit 43 is input into the gate of the switching element S7. The switching elements S5 to S7 execute an operation of switching between an on-state and an off-state on the basis of the switching signals SS1 to SS3.

Next, output states achieved depending on charging and discharging of the main power supply 4 and the auxiliary power supply unit 50 will be described below with reference to FIG. 3 and FIG. 4A to FIG. 4D. The main power supply 4 and the auxiliary power supply unit 50 form a first output state, a second output state, a third output state, and a fourth output state depending on the operations of the switching elements S1 to S7 of the charging-discharging circuit 53, the boosting circuit 52, and the switching circuit 55.

Figure 4A:
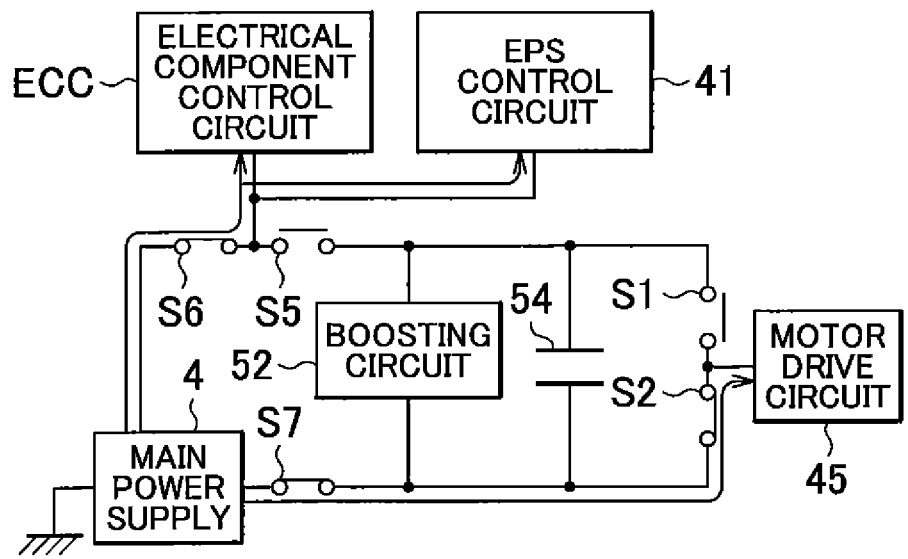

As illustrated in FIG. 3, in the first output state, the switching element S1 is in the off-state, the switching element S2 is in the on-state, the switching element S3 is in the off-state, the switching element S4 is in the off-state, the switching element S5 is in the off-state, the switching element S6 is in the on-state, and the switching element S7 is in the on-state. Thus, as illustrated in FIG. 4A, in the first output state, the main power supply 4 supplies electric power to the capacitor 54 and the motor drive circuit 45, and the capacitor 54 does not supply electric power to the motor drive circuit 45. In the first output state, the main power supply 4 is electrically connected to the electrical component control circuit ECC and the EPS control circuit 41, and the capacitor 54 is electrically disconnected from the electrical component control circuit ECC and the EPS control circuit 41. Thus, only the main power supply 4 supplies electric power to the electrical component control circuit ECC and the EPS control circuit 41.

Figure 4B:
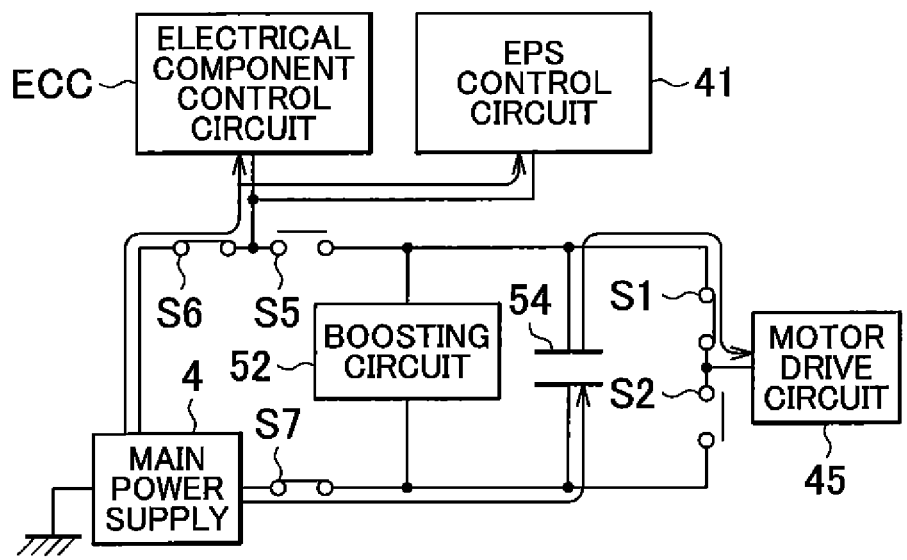

As illustrated in FIG. 3, in the second output state, the switching element S1 is in the on-state, the switching element S2 is in the off-state, the switching element S3 is in the off-state, the switching element S4 is in the off-state, the switching element S5 is in the off-state, the switching element S6 is in the on-state, and the switching element S7 is in the on-state. Thus, as illustrated in FIG. 4B, in the second output state, electric power is supplied to the motor drive circuit 45 in a state where the battery voltage VB of the main power supply 4 is boosted by the capacitor 54. The mode of electric power supply to the electrical component control circuit ECC and the EPS control circuit 41 in the second output state is the same as that in the first output state.

Figure 4C:
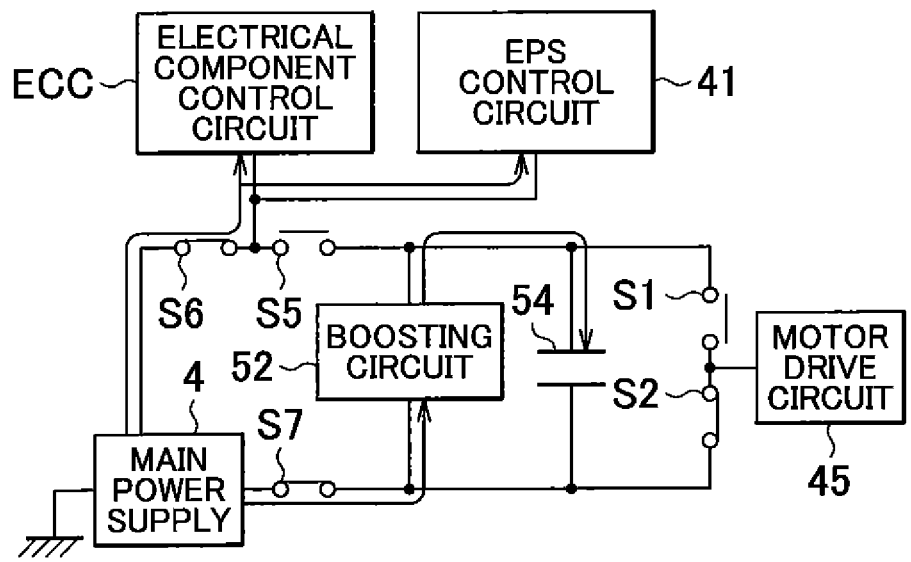

As illustrated in FIG. 3, in the third output state, the switching element S1 is in the off-state, the switching element S2 is in the on-state, the switching elements S3, S4 are subjected to PWM driving, the switching element S5 is in the off-state, the switching element S6 is in the on-state, and the switching element S7 is in the on-state. Thus, as illustrated in FIG. 4C, in the third output state, the capacitor 54 is rapidly charged in the state where the battery voltage VB of the main power supply 4 is boosted by the boosting circuit 52. Specifically, when the switching element S3 is in the off-state and the switching element S4 is in the on-state, one end of the boosting coil 52A is grounded and thus electric power is supplied to the boosting coil 52A. By switching the switching element S3 from the off-state to the on-state and switching the switching element S4 from the on-state to the off-state, an induced voltage generated in the boosting coil 52A is superposed on the battery voltage VB and is then supplied to the capacitor 54. The mode of electric power supply to the electrical component control circuit ECC and the EPS control circuit 41 in the third output state is the same as that in the first output state. In the PWM driving of the switching elements S3, S4, when the switching element S3 is in the on-state, the switching element S4 is in the off-state.

Figure 4D:
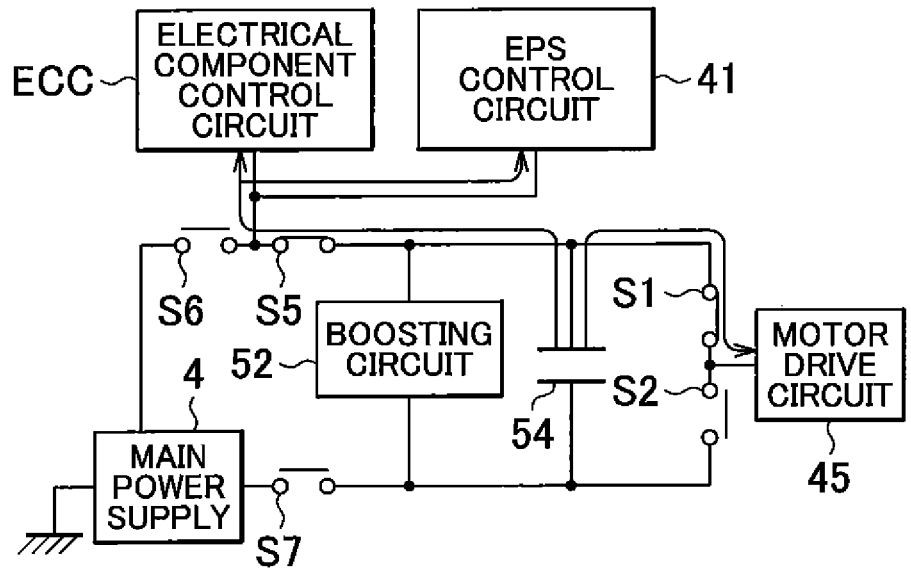

As illustrated in FIG. 3, in the fourth output state, the switching element S1 is in the on-state, the switching element S2 is in the off-state, the switching element S3 is in the off-state, the switching element S4 is in the on-state, the switching element S5 is in the on-state, the switching element S6 is in the off-state, and the switching element S7 is in the off-state. Thus, as illustrated in FIG. 4D, in the fourth output state, the main power supply 4 does not supply power to the motor drive circuit 45, and the capacitor 54 discharges electricity to the motor drive circuit 45. In the fourth output state, the main power supply 4 is electrically disconnected from the electrical component control circuit ECC and the EPS control circuit 41, and the capacitor 54 is electrically connected to the electrical component control circuit ECC and the EPS control circuit 41. Thus, only the capacitor 54 discharges electricity to the electrical component control circuit ECC and the EPS control circuit 41.

Details of the power supply control will be described below with reference to FIG. 5 to FIG. 7. In the following description with reference to FIG. 5 to FIG. 7, elements of the electric power steering system 1 denoted by reference symbols represent the elements of the electric power steering system 1 illustrated in FIG. 1 or FIG. 2.

EPS requiring power represents the electric power required of the main power supply 4 due to the assist control. The EPS requiring power varies on the basis of variations in the vehicle speed VS and the steering state. Source power PS represents electric power that is supplied from the main power supply 4 to the auxiliary power supply unit 50 due to the assist control. The source power PS is computed on the basis of the battery current IB and the battery voltage VB. A charging-discharging threshold value KE represents a reference value for switching the state between a state where only the electric power from the main power supply 4 is supplied to the motor drive circuit 45 and a state where the electric power from the main power supply 4 and the electric charge from the capacitor 54 are supplied to the motor drive circuit 45. The charging-discharging threshold value KE is set in advance by experiments or the like.

In the power supply control, the output state of the main power supply 4 and the auxiliary power supply unit 50 is set to one of the first output state to the fourth output state on the basis of the source power PS, the charging-discharging threshold value KE, and the amount of electric charge remaining in the capacitor 54.

Figure 5:
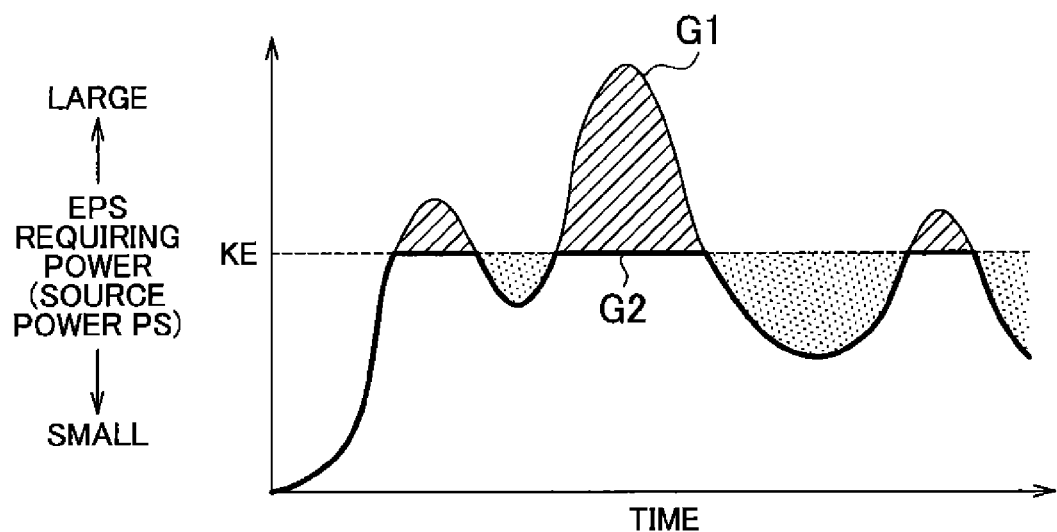
FIG. 5 is a graph illustrating transitions of EPS requiring power and source power in the embodiment.
Figure 6:
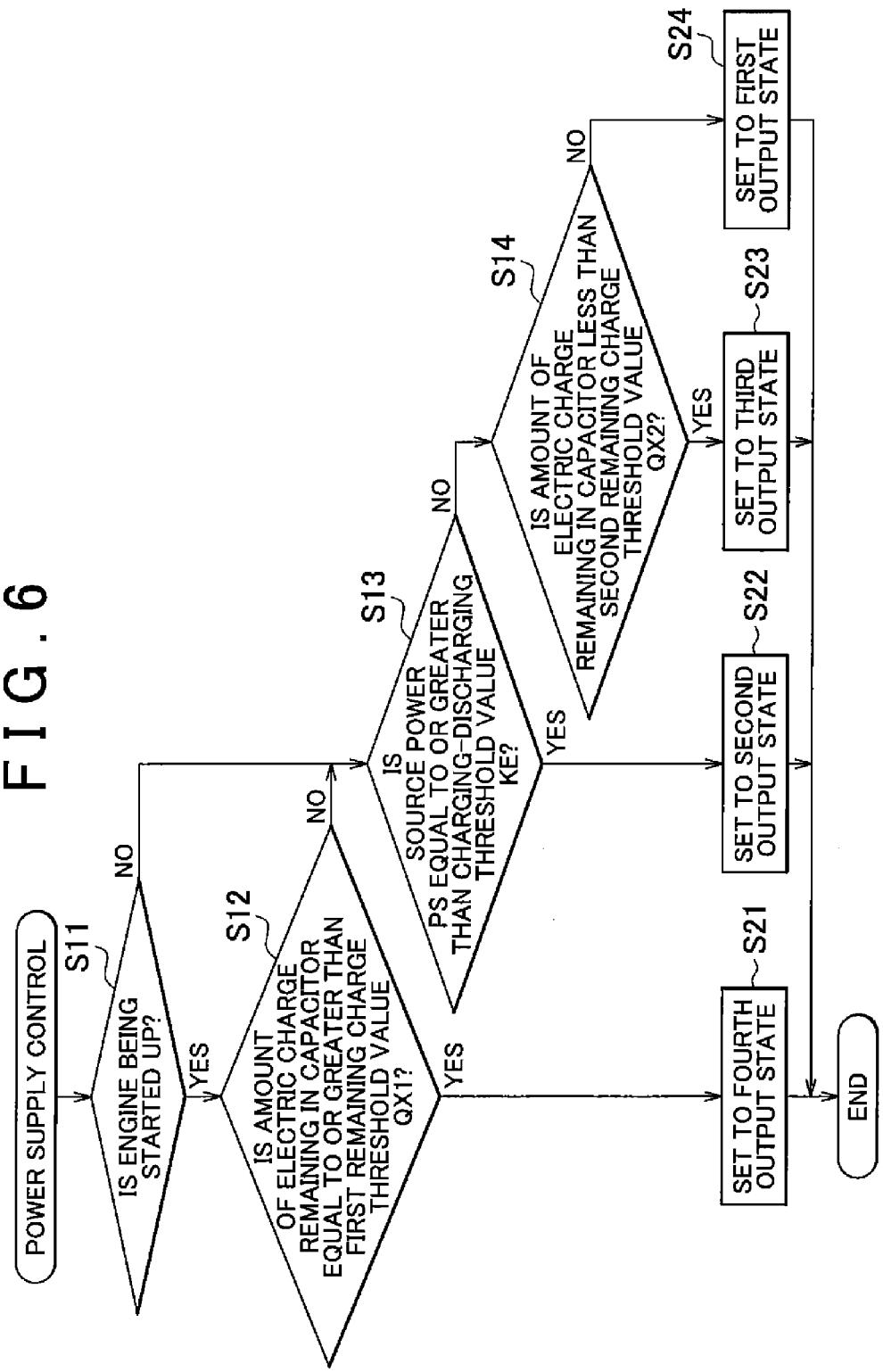
FIG. 6 is a flowchart illustrating the process of power supply control.

With reference to FIG. 5, description will be provided on the switchover among the first output state to the third output state based on the steering by the electric power steering system 1 in the power supply control. A graph G1 represents a transition of the EPS requiring power. A graph G2 represents a transition of the source power PS indicated by a bold line.

The controller 40 sets the output state to the first output state through the power supply control, when the source power PS is less than the charging-discharging threshold value KE after the engine is started up or when the engine is stopped. Because the EPS requiring power is covered by the electric power from the main power supply 4, the source power PS and the EPS requiring power are equal to each other. Thus, as indicated by the graphs G1, G2 in FIG. 5, the source power PS is less than the charging-discharging threshold value KE and is equal to the EPS requiring power within a period in which the EPS requiring power is less than the charging-discharging threshold value KE.

The controller 40 sets the output state to the second output state through the power supply control when the source power PS is equal to or greater than the charging-discharging threshold value KE after the engine is started up or when the engine is stopped. As indicated by the graph G2 in FIG. 5, the source power PS is equal to the charging-discharging threshold value KE in a period in which the EPS requiring power is equal to or greater than the charging-discharging threshold value KE. That is, the source power PS is subjected to peak-cut within the period in which the EPS requiring power is equal to or greater than the charging-discharging threshold value KE. In the period in which the EPS requiring power is equal to or greater than the charging-discharging threshold value KE, the electric power corresponding to the difference between the EPS requiring power and the charging-discharging threshold value KE is covered by the capacitor 54. An example of the case in which the source power PS is equal to or greater than the charging-discharging threshold value KE is a case in which a driver performs stationary steering on the steering member 2 while the vehicle is being placed in a garage or the vehicle is being parked.

The controller 40 sets the output state to the third output state through the power supply control, after the output state is set to the second output state and the capacitor 54 discharges electricity to the motor drive circuit 45, that is, when the source power PS becomes less than the charging-discharging threshold value KE. The capacitor 54 is rapidly charged. The sections indicated by dots in FIG. 5 represent the charging period for the capacitor 54.

The process of the power supply control executed by the controller 40 will be described below with reference to FIG. 6. This process is repeatedly executed at prescribed time intervals. The controller 40 sets the output state to one of the first output state to the fourth output state on the basis of the following determinations a to d.

a. Is the engine being started up? (step S11)
    b. Is the amount of electric charge remaining in the capacitor 54 equal to or greater than a first remaining threshold value QX1? (step S12)
    c. Is the source power PS equal to or greater than the charging-discharging threshold value KE? (step S13)
    d. Is the amount of electric charge remaining in the capacitor 54 equal to or greater than a second remaining threshold value QX2? (step S14)

In this case, the engine start-up period means a period from the time at which the controller 40 receives an output signal indicating that the engine is started from an engine start-and-stop computer (not illustrated) to the time at which the battery voltage VB becomes equal to or greater than a predetermined voltage threshold value VX. The voltage threshold value VX is a voltage at which a malfunction of the electrical component control circuit ECC is suppressed. The voltage threshold value VX is set in advance by experiments or the like.

The amount of electric charge remaining in the capacitor 54 is computed on the basis of the voltage of the capacitor 54. The voltage of the capacitor 54 is measured with the use of A/D conversion in the microcomputer 42. The first remaining charge threshold value QX1 represents the lower limit value of the amount of electric charge remaining in the capacitor 54, at which the capacitor 54 is able to supply a voltage, at which the electrical component control circuit ECC is able to normally operate, to the electrical component control circuit ECC. The first remaining charge threshold value QX1 is set in advance by experiments, simulations, or the like.

The second remaining charge threshold value QX2 represents the upper limit value of the amount of electric charge remaining in the capacitor 54, at which the capacitor 54 needs to be charged. The second remaining charge threshold value QX2 is greater than the first remaining charge threshold value QX1. The second remaining charge threshold value QX2 is set in advance by experiments, simulations, or the like. The second remaining charge threshold value QX2 in the present embodiment is set to a value corresponding to the full charging of the capacitor 54.

When an affirmative determination is made in each of step S11 and step S12, the controller 40 sets the output state to the fourth output state in step S21. When the capacitor 54 is able to discharge electricity to the electrical component control circuit ECC in the engine start-up period, the controller 40 sets the output state to the fourth output state.

When a negative determination is made in one of step S11 and step S12 and an affirmative determination is made in step S13, the controller 40 sets the output state to the second output state in step S22. When stationary steering is performed at the time other than the engine start-up period, the controller 40 sets the output state to the second output state. When the stationary steering is performed while the capacitor 54 is not able to discharge electricity to the electrical component control circuit ECC in the engine start-up period, the controller 40 sets the output state to the second output state.

When a negative determination is made in one of step S11 and step S12, a negative determination is made in step S13, and an affirmative determination is made in step S14, the controller 40 sets the output state to the third output state in step S23. When the stationary steering is not performed at the time other than the engine start-up period while the capacitor 54 is not fully charged, the controller 40 sets the output state to the third output state. When the stationary steering is not performed while the capacitor 54 is not able to discharge electricity to the electrical component control circuit ECC (when the capacitor 54 is not fully charged) in the engine start-up period, the controller 40 sets the output state to the third output state.

When a negative determination is made in one of step S11 and step S12 and a negative determination is made in each of step S13 and step S14, the controller 40 sets the output state to the first output state in step S24. When the stationary steering is not performed at the time other than the engine start-up period while the capacitor 54 is fully charged, the controller 40 sets the output state to the first output state.

An example of a mode of execution of the power supply control will be described below with reference to FIG. 7. As indicated by a graph A in FIG. 7, the engine of the vehicle is started from an idle reduction state at time t11. Then, the vehicle is placed in the idle reduction state again by shifting from the engine operating state to the engine stop state at time t19.

As indicated by a graph B in FIG. 7, the battery voltage VB rapidly drops due to the starting of the engine at time t11 and falls below the voltage threshold value VX. The battery voltage VB increases due to the charging by the alternator 4B at time t12. The battery voltage VB reaches the voltage threshold value VX at time t13. The period from time t11 to time t13 corresponds to the engine start-up period.

Figure 7:
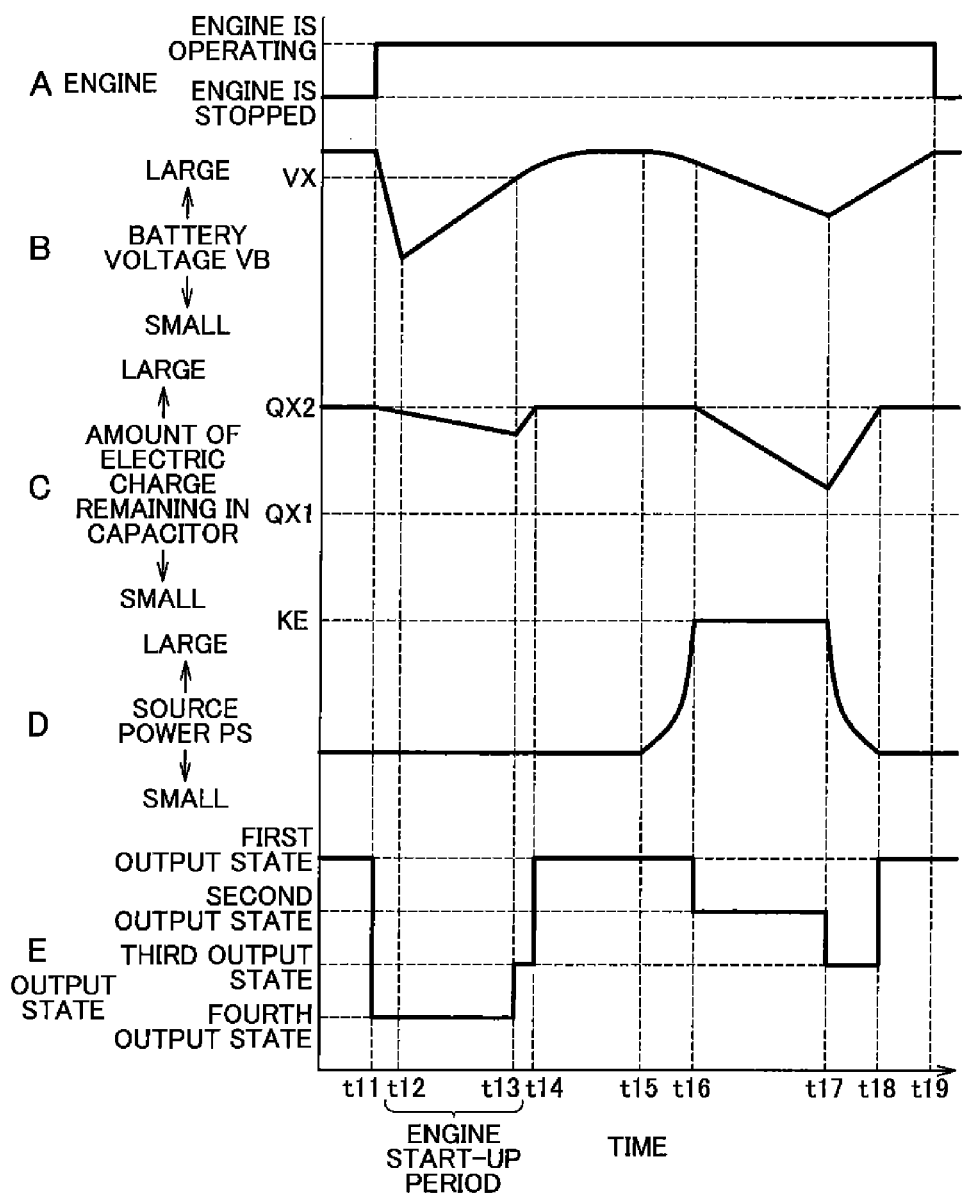
FIG. 7 is a time chart illustrating an example of a mode of execution of the power supply control in the embodiment.

As indicated by a graph C in FIG. 7, the amount of electric charge remaining in the capacitor 54 is equal to or greater than the first remaining charge threshold value QX1 at time t11. Thus, the controller 40 sets the output state to the fourth output state at time t11.

As indicated by a graph D in FIG. 7, the source power PS is small in the period from time t11 to time t13. As indicated by the graph C in FIG. 7, the amount of electric charge remaining in the capacitor 54 decreases with a lapse of time from time t11. As described above, because the source power PS is small in the period from time t11 to time t13 is small and the amount of electricity discharged from the capacitor 54 to the electrical component control circuit ECC and the EPS control circuit 41 is originally small, a decrease in the amount of electric charge in the capacitor 54 is small. Thus, the amount of electric charge remaining in the capacitor 54 is equal to or greater than the first remaining charge threshold value QX1 in the period from time t11 to time t13. Thus, as indicated by a graph E in FIG. 7, the controller 40 sets the output state to the fourth output state in the period from time t11 to time t13.

As indicated by the graph C in FIG. 7, the amount of electric charge remaining in the capacitor 54 is less than the second remaining charge threshold value QX2 at time t13. As indicated by the graph D in FIG. 7, the source power PS is less than the charging-discharging threshold value KE at time t13.

Thus, as indicated by the graph E in FIG. 7, the controller 40 sets the output state to the third output state at time t13. As a result, the capacitor 54 is rapidly charged by the boosting circuit 52. The amount of electric charge remaining in the capacitor 54 rapidly increases with a lapse of time from time t13. The amount of electric charge remaining in the capacitor 54 reaches the second remaining charge threshold value QX2 at time t14. That is, the capacitor 54 is fully charged at time t14. The controller 40 sets the output state to the first output state at time t14.

As indicated by the graph D in FIG. 7, the source power PS increases due to the steering of the steering member 2 at time t15. At time t16, the source power PS becomes equal to or greater than the charging-discharging threshold value KE. The source power PS is equal to or greater than the charging-discharging threshold value KE in the period from time 116 to time t17.

Thus, as indicated by the graph E in FIG. 7, the controller 40 sets the output state to the second output state in the period from time t16 to time t17. As a result, the capacitor 54 discharges electricity to the motor drive circuit 45. As indicated by the graph C in FIG. 7, the amount of electric charge remaining in the capacitor 54 decreases throughout the period from time t16 to time t17.

As indicated by the graph D in FIG. 7, the source power PS is less than the charging-discharging threshold value KE at and after time t17. As indicated by the graph C in FIG. 7, the amount of electric charge remaining in the capacitor 54 becomes less than the second remaining charge threshold value QX2 at time t17.

Thus, as indicated by the graph E in FIG. 7, the controller 40 sets the output state to the third output state at time t17. As a result, the capacitor 54 is rapidly charged by the boosting circuit 52. The amount of electric charge remaining in the capacitor 54 reaches the second remaining charge threshold value QX2 at time t18. Thus, the controller 40 sets the output state to the first output state at time t18.

The operation of the electric power steering system 1 according to the present embodiment will be described below. In the following description, in a virtual configuration to be compared with the configuration of the electric power steering system 1 according to the present embodiment, the same elements as those in the electric power steering system 1 will be denoted by the same reference symbols as those in the present embodiment for the purpose of convenience.

The electric power steering system 1 has a first function and a second function. The first function is a function of restraining the microcomputers 7C to 9C of the electrical component control circuit ECC and the microcomputer 42 of the EPS control circuit 41 from being initialized due to a voltage drop of the main power supply 4. The second function is a function of restraining the amount of electric charge remaining in the capacitor 54 from falling below the first remaining charge threshold value QX1.

Details of the first function will be described below. In the engine start-up period, the starter motor 6 is driven, and thus the battery voltage VB rapidly drops. Thus, if the assumption is made that electric power is supplied from only the main power supply 4 to the electrical components EC and the EPS control circuit 41 in the engine start-up period, the voltage that is supplied to the electrical component control circuit ECC and the EPS control circuit 41 also drops.

The microcomputers 7C to 9C of the electrical component control circuit ECC are initialized if the voltage required to drive the microcomputers 7C to 9C is not supplied to the microcomputers 7C to 9C due to a drop of the battery voltage VB. The microcomputer 42 of the EPS control circuit 41 is also initialized. Particularly, in a vehicle having a stop-and-start system, the engine is stopped each time the vehicle stops travelling at a traffic light. Thus, as the number of times of start-up of the engine increases, the number of times of initialization of the microcomputers 7C to 9C and the microcomputer 42 increases.

Thus, when the assumption is made that the microcomputer 7C of the ETC control circuit 7A is initialized in the engine start-up period, the ETC onboard device 7 performs voice guidance for initialization. When the assumption is made that the microcomputer 8C of the measuring instrument control circuit 8A is initialized in the engine start-up period, the measuring instruments 8 are deleted from the display of the vehicle. When the assumption is made that the microcomputer 9C of the brake control circuit 9A is initialized in the engine start-up period, the ABS control function of the brake control unit 9 deteriorates. When the assumption is made that the microcomputer 42 of the EPS control circuit 41 is initialized in the engine start-up period, the time required for the microcomputer 42 of the controller 40 to compute the assist force increases. Thus, there may be a delay in generation of the assist force from the assist motor 31 when the steering member 2 is operated in the engine start-up period.

Therefore, a configuration in which a DC-DC converter (not illustrated) is disposed between the main power supply 4, and the electrical components EC and the EPS control circuit 41 (hereinafter, referred to as a first virtual configuration) may be adopted in order to restrain the microcomputers 7C to 9C and the microcomputer 42 from being initialized in the engine start-up period. The first virtual configuration suppresses a drop of the battery voltage VB by boosting the battery voltage VB with the use of the DC-DC converter in the engine start-up period.

A configuration in which a sub-power supply that is prepared separately from the main power supply 4 and that differs from the elements of the electric power steering system 1 is electrically connected to the electrical components EC and the EPS control circuit 41 (hereinafter, referred to as a second virtual configuration) may be adopted. The second virtual configuration avoids the influence of a drop of the battery voltage VB on the electrical components EC by electrically disconnecting the main power supply 4 from the electrical components EC and the EPS control circuit 41 and electrically connecting the sub-power supply to the electrical components EC and the EPS control circuit 41 in the engine start-up period.

By adopting the first virtual configuration or the second virtual configuration, the microcomputers 7C to 9C and the microcomputer 42 are restrained from being initialized in the engine start-up period. However, it is necessary to additionally provide the DC-DC converter when the first virtual configuration is adopted, and it is necessary to additionally provide the sub-power supply when the second virtual configuration is adopted. Thus, when the first virtual configuration or the second virtual configuration is adopted, the number of components of the vehicle increases.

In the electric power steering system 1 according to the present embodiment, the capacitor 54 of the auxiliary power supply unit 50 discharges electricity to the electrical component control circuit ECC of the electrical components EC and the EPS control circuit 41 in the engine start-up period. Because the capacitor 54 does not discharge electricity to the starter motor 6, a drop of the voltage of the capacitor 54 due to the starter motor 6 in the engine start-up period is suppressed. Thus, the microcomputers 7C to 9C and the microcomputer 42 are restrained from being initialized.

In addition, the capacitor 54 of the auxiliary power supply unit 50 is used to discharge electricity to the electrical component control circuit ECC and the EPS control circuit 41.

Thus, it is no longer necessary to additionally provide any component for supply of electric power to the electrical component control circuit ECC and the EPS control circuit 41. Compared with the first virtual configuration and the second virtual configuration, an increase in the number of components of the vehicle is suppressed in the present embodiment.

As the configuration for restraining the microcomputers 7C to 9C and the microcomputer 42 from being initialized with the use of the capacitor 54 of the auxiliary power supply unit 50, a configuration in which the capacitor 54 discharges electricity to the main power supply 4 in the engine start-up period (hereinafter, referred to as a third virtual configuration) may be adopted.

In the third virtual configuration, because it is necessary to cover a drop of the battery voltage VB in the engine start-up period with the use of the capacitor 54, it is necessary to increase the capacity of the capacitor 54. That is, the capacitor 54 of the third virtual configuration needs to have capacity greater than the capacity necessary for causing the capacitor 54 to discharge electricity to the motor drive circuit 45 in the second output state.

In contrast to this, in the electric power steering system 1 according to the present embodiment, because the capacitor 54 discharges electricity to the electrical component control circuit ECC and the EPS control circuit 41, the amount of electricity discharged from the capacitor 54 in the engine start-up period is smaller than that in the third virtual configuration. In the electric power steering system 1 according to the present embodiment, the amount of electricity discharged from the capacitor 54 in the engine start-up period is smaller than the amount of electricity discharged from the capacitor 54 to the motor drive circuit 45 in the second output state. Thus, an increase in capacity of the capacitor 54 is suppressed.

Details of the second function will be described below. The controller 40 sets the output state to the third output state when the amount of electric charge remaining in the capacitor 54 is less than the second remaining charge threshold value QX2 after the engine is started up or when the engine is stopped. Thus, the capacitor 54 is rapidly charged by the boosting circuit 52. For example, when the vehicle is in the idle reduction state and the amount of electric charge remaining in the capacitor 54 is less than the second remaining charge threshold value QX2, the capacitor 54 is charged. When the engine is started up while the vehicle is in the idle reduction state, the amount of electric charge remaining in the capacitor 54 is restrained from falling below the first remaining charge threshold value QX1 that is smaller than the second remaining charge threshold value QX2.

Advantageous effects of the electric power steering system 1 according to the present embodiment will be described below. The controller 40 of the electric power steering system 1 sets the output state to the fourth output state when the amount of electric charge remaining in the capacitor 54 is equal to or greater than the first remaining charge threshold value QX1 in the engine start-up period. Thus, it is possible to suppress malfunctions of the electrical components EC and the assist motor 31 due to a rapid drop of the battery voltage VB in the engine start-up period.

In the engine start-up period, the main power supply 4 is electrically disconnected from the electrical components EC and the assist motor 31. Thus, the electrical components EC and the assist motor 31 are restrained from being influenced by a voltage drop in the main power supply 4 in the engine start-up period.

The controller 40 sets the output state to the third output state when the amount of electric charge remaining in the capacitor 54 is less than the second remaining charge threshold value QX2 in the power supply control. Thus, the probability that malfunctions of the electrical components EC and the assist motor 31 will be suppressed in the engine start-up period is increased.

An electric power steering system according to the invention may be implemented in various embodiments other than the above-described embodiment. Modified examples of the above-described embodiment will be described below as other embodiments of the electric power steering system. The following modified examples may be combined with each other within a technical scope of the invention.

In the power supply control in the above-described embodiment, the second remaining charge threshold value QX2 may be set to a value different from the value corresponding to the full charging of the capacitor 54. For example, the second remaining charge threshold value QX2 is set to a value less than the value corresponding to the full charging of the capacitor 54 and greater than the first remaining charge threshold value QX1.

In the power supply control in the above-described embodiment, the engine start-up period may be replaced with the period in which the starter motor 6 is driven. The assist motor 31 in the above-described embodiment may be a brushed motor.

The auxiliary power supply unit 50 in the above-described embodiment may be disposed at a position apart from the controller 40. That is, the location of the auxiliary power supply unit 50 is not particularly limited as long as the auxiliary power supply unit 50 is disposed near one of the steering mechanism 10 and the steered mechanism 20 of the electric power steering system 1.

In the auxiliary power supply unit 50 in the above-described embodiment, a secondary battery such as a lithium-ion battery is used as the auxiliary power supply instead of the capacitor 54. The auxiliary power supply unit 50 in the above-described embodiment may include a plurality of capacitors 54.

The charging-discharging operation of the auxiliary power supply unit 50 in the above-described embodiment is controlled through the power supply control by the controller 40. However, the control of the charging-discharging operation of the auxiliary power supply unit 50 is not limited to the control described in the above-described embodiment. For example, the auxiliary power supply unit 50 according to a modified example includes a power supply control unit that executes the power supply control. The charging-discharging operation of the auxiliary power supply unit 50 according to another modified example is controlled through the power supply control which is executed by a power supply control unit formed independently of the controller 40.

As the capacitor 54 in the above-described embodiment, a lithium-ion capacitor may be used instead of the electrical double-layer capacitor. As the switching elements S1 to S7 of the auxiliary power supply unit 50 in the above-described embodiment, insulated gate bipolar transistors (IGBTs) may be used instead of the MOSFETs. As the switching elements S1 to S7, electromagnetic switches such as relays may be used instead of the MOSFETs.

The switching circuit 55 in the above-described embodiment is electrically connected to the EPS control circuit 41 and the electrical components EC. However, the mode of connection of the switching circuit 55 is not limited to the mode described in the above-described embodiment. For example, the switching circuit 55 in a modified example is electrically connected to the EPS control circuit 41 or the electrical components EC. In this modified example, the EPS control circuit 41 or the electrical components EC, which is/are not electrically connected to the switching circuit 55, is/are electrically connected to the main power supply 4.

The electrical components EC in the above-described embodiment may be electrical components other than the ETC onboard device 7, the measuring instruments 8, and the brake control unit 9. For the electrical components EC in the above-described embodiment, the main power supply 4 is used as the drive source for the electrical components EC. However, the drive source for the electrical components EC is not limited to the drive source described in the above-described embodiment. For example, the capacitor 54 is used as the drive source for the electrical components EC in a modified example.

The technical idea that can be understood from the above-described embodiment and the above-described modified examples will be described below.

The electric power steering system includes a boosting circuit that boosts the voltage of the main power supply and that applies the boosted voltage to the auxiliary power supply, and the third switching element is located between the main power supply and the boosting circuit.

In the electric power steering system, when the amount of electric charge remaining in the auxiliary power supply is less than a charging threshold value that is greater than the threshold value, the auxiliary power supply is charged in a state where the voltage of the main power supply is boosted by the boosting circuit.

In the electric power steering system, the number of times of charging the auxiliary power supply increases. Thus, the probability that the amount of electric charge remaining in the auxiliary power supply will fall below the threshold value decreases. As a result, the probability that the auxiliary power supply will discharge electricity to the electrical component or the control circuit in the engine start-up period increases. The charging threshold value corresponds to the second remaining charge threshold value QX2.

What is claimed is:

1. An electric power steering system comprising:
   an assist motor that generates assist force for assisting steering of a steering member;
   a drive control unit that controls driving of the assist motor;
   an auxiliary power supply that is electrically connected to an electrical component of a vehicle other than the assist motor and the drive control unit, one of the assist motor and the drive control unit, and a main power supply electrically connected to the assist motor;
   a power supply control unit that controls supply of electric power from the auxiliary power supply to the electrical component,
   wherein the power supply control unit supplies the electric power from the auxiliary power supply to the electrical component when an amount of electric charge remaining in the auxiliary power supply is equal to or greater than a threshold value in an engine start-up period in the vehicle; and
   a switching circuit including:
      a first switching element that switches a state between a state where the electrical component and the auxiliary power supply are electrically connected to each other and a state where the electrical component and the auxiliary power supply are electrically disconnected from each other;
      a second switching element that switches a state between a state where the main power supply and the auxiliary power supply are electrically connected to each other and a state where the main power supply and the auxiliary power supply are electrically disconnected from each other; and
      a third switching element that switches a state between a state where the electrical component and the main power supply are electrically connected to each other and a state where the electrical component and the main power supply are electrically disconnected from each other,
   wherein the power supply control unit controls the first switching element to realize the state where the electrical component and the auxiliary power supply are electrically connected to each other, controls the second switching element to realize the state where the auxiliary power supply and the main power supply are electrically disconnected from each other, and controls the third switching element to realize the state where the electrical component and the main power supply are electrically disconnected from each other when the amount of electric charge remaining in the auxiliary power supply is equal to or greater than the threshold value in the engine start-up period.

2. The electric power steering system according to claim 1, further comprising
   a control circuit that controls an operation of the assist motor, wherein
   the auxiliary power supply is electrically connected to the control circuit, and
   the power supply control unit supplies the electric power from the auxiliary power supply to the control circuit when the amount of electric charge remaining in the auxiliary power supply is equal to or greater than the threshold value in the engine start-up period.

3. The electric power steering system according to claim 2, further comprising
   a boosting circuit that boosts a voltage of the main power supply and that applies the boosted voltage to the auxiliary power supply, wherein
   the third switching element is located between the main power supply and the boosting circuit.

4. The electric power steering system according to claim 3, wherein, when the amount of electric charge remaining in the auxiliary power supply is less than a charging threshold value that is greater than the threshold value, the auxiliary power supply is charged in a state where the voltage of the main power supply is boosted by the boosting circuit.

* * * * *